July 24, 1956 — R. O. MICHEL — 2,756,115
PNEUMATIC BEARING CONSTRUCTION
Filed Oct. 9, 1952 — 2 Sheets-Sheet 1

INVENTOR.
ROSS O. MICHEL
BY
HIS ATTORNEYS

July 24, 1956 R. O. MICHEL 2,756,115
PNEUMATIC BEARING CONSTRUCTION
Filed Oct. 9, 1952 2 Sheets-Sheet 2

ABOVE NORMAL LOAD

NORMAL LOAD

BELOW NORMAL LOAD

INVENTOR.
ROSS O. MICHEL
BY
*Willits, Hardman & Fehr*
HIS ATTORNEYS

United States Patent Office 2,756,115
Patented July 24, 1956

2,756,115

PNEUMATIC BEARING CONSTRUCTION

Ross O. Michel, Dayton, Ohio, assignor to General Motors Corporation, Detroit, Mich., a corporation of Delaware Application October 9, 1952, Serial No. 313,927

9 Claims. (Cl. 308—9)

The present invention pertains to pneumatic bearings, and has particular reference to bearing means for rotatably supporting a shaft and having a mass adjacent the opposite end thereof, the arrangement being similar in nature to that of a cantilever support.

Heretofore the frictional resistance inherent in roll, ball or journal type bearings has materially affected the accuracy of balancing devices employing such bearings. Pneumatic bearings, however, can be constructed to support a rotatable member without appreciable friction. This friction factor is of particular importance in mass centering propeller blades to determine and correct any discrepancy caused by the displacement of the center of gravity of the blade from the final blade centerline. A conventional journal bearing is impractical for any such application wherein a shaft must run concentric with a bearing housing centerline, as proper lubrication of this type of bearing relies on rotation about an eccentric centerline. However, in properly designed pneumatic bearings any deviation in the concentric position of the rotating journal member with respect to the support will result in the establishment of a pressure differential, which automatically restores the concentric relationship of the several parts. Accordingly, my objects include the provision of a pneumatic bearing construction having remarkable sensitivity due to extraordinarily low friction, and a bearing of simple design affording easy fabrication and maintenance.

The aforementioned and other objects are accomplished in the present invention by providing a pneumatic bearing with means for sustaining both axial and thrust loads. The bearing assembly is constructed to support radial loads by a force couple, while thrust loads are sustained by a floating shoulder arrangement. Specifically, the bearing includes a through bored casing within which a pair of axially separated bushings or bearing members are disposed. Each bushing has a single row of radially extending, circumferentially spaced orifices extending throughout substantially 180° of the periphery thereof. The bushings are so located within the through bore of the casing that the orifices in one bushing are substantially diametrically opposed to the orifices of the other bushing. Suitable inlet and exhaust ports are formed in the casing for the admission and exhaust of pressurized air. In this manner radial loads of a shaft journaled within the bushings are in effect supported by a force couple constituted by the axially separated diametrically opposed pressurized air areas or glands.

The casing is further formed with an annular channel circumscribing the through bore within which a radially extending shoulder of the shaft, to be supported, is disposed. Orificed annular rings are located in opposite sidewalls of the annular channel through which pressurized air is admitted to opposite sides of the shaft shoulder for sustaining end thrust loads applied to the supported shaft.

Further objects and advantages of the present invention will be apparent from the following description, reference being had to the accompanying drawings wherein a preferred embodiment of the present invention is clearly shown.

Figure 1:
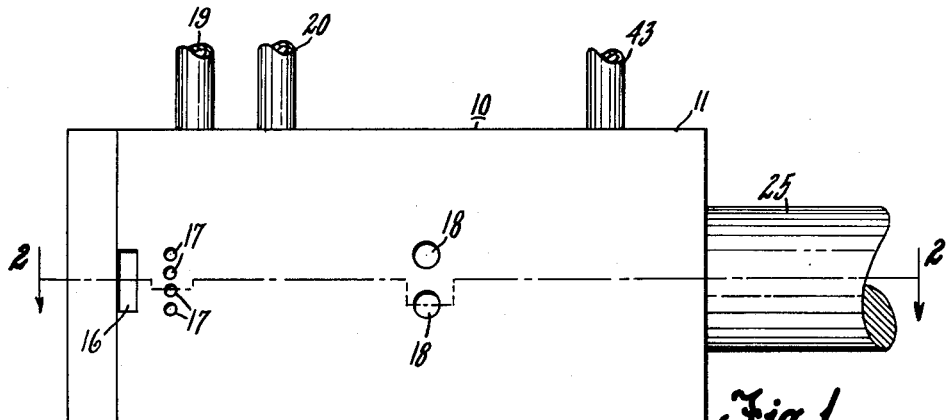
Fig. 1 is a view in elevation of a bearing constructed according to this invention.

Referring more particularly to the drawings, wherein like reference characters denote similar parts throughout the several views, a bearing assembly constructed according to the present invention is indicated by the numeral 10 in Fig. 1. The bearing assembly 10 includes a casing 11 having a longitudinally extending through bore 12, a plurality of pressurized air inlet ports 13, 14 and 15, and a plurality of exhaust ports 16, 17, and 18 disposed in axially spaced planes. Provision is made for connecting conduits 19, 20 and 43 to the pressurized air inlet ports 13, 14 and 15, respectively.

Disposed within the through bore and maintained therein by any suitable means such as a plug fit, are a pair of axially spaced bushings 21 and 22 presenting bearing surfaces on their internal peripheral surfaces. Adjacent one end of the casing 11, the through bore 12 is of enlarged diameter to form an annular channel 23 circumscribing the through bore 12 when an end member 24 is attached to the casing 11 by any suitable means, such as screw devices, not shown. A shaft 25 is adapted to run in the bearing, the shaft fitting snugly within the hollow bushings 21 and 22 with only sufficient clearance therebetween to provide space for a film of compressed air about portions of the shaft. The shaft 25 has attached thereto at one end a shoulder member 26 adapted to extend radially into the channel 23 formed by the members 11 and 24. The other end of the shaft 25 may be adapted to support any suitable load, not shown, having radial or thrust components, or any combination thereof.

With particular reference to Figs. 2, 2A, 5, and 6, the means for supporting thrust loads of shaft 25 will now be described. The shoulder 26 fits rather snugly within the channel 23, with only sufficient clearance therebetween to provide space for a film of compressed air. As the sidewalls forming the channel 23 are of similar construction, a detailed description of one is deemed to be sufficient, with like part of the other sidewall being denoted by like reference numerals with primes affixed. Accordingly, sidewall 27 of the channel 23 has an annular groove 28 therein, which is radially spaced from but circumscribes the through bore 12 of the casing 11. Disposed within the channel 28 is an L-shaped member 29 presenting a surface 30 substantially flush with the surface of sidewall 27. The insert 29 is retained within the groove 28 by any suitable means, such as a press fit. The annular insert 29 has a plurality of spaced orifices 31 extending circumferentially therearound on one leg of its L shape. By reason of the member 29 being L-shaped, a chamber is formed within the annular channel 28, the chamber communicating with an opening 32 and inlet port 13. A longitudinally extending passageway 33 connects the inlet port 13 with a radially extending passage 34, one end of which is closed by a plug 35 and the other end of which communicates through an opening 36 with the annular channel 28' of the member 24, Accordingly, pressurized air admitted via conduit 19 to inlet port 13 passes through the orifices 31 and 31' and establishes a pressurized area on opposite sides of the shoulder 26 for sustaining thrust loads imposed upon shaft 25. Pressurized air admitted to the channel 23 on opposite sides of the shoulder 26 may exhaust through the exhaust ports 16, 17 and the open end of member 24.

Figure 2:
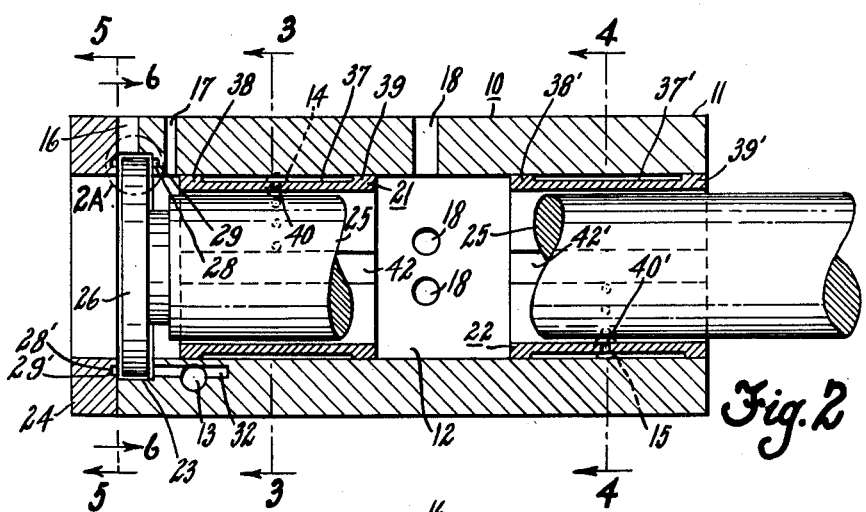
Fig. 2 is a longitudinal sectional view taken along line 2—2 of Fig. 1.
Figure 2A:
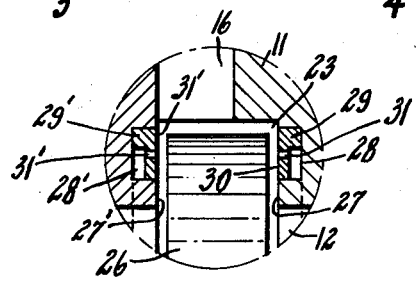
Fig. 2A is an enlarged sectional view of the area inscribed by circle 2A in Fig. 2.

The thrust loads are sustained in the following manner: if thrust is applied to the left or the right of the shaft 25, as viewed in Figs. 2 and 2A, the escape clearances between the sidewalls of the channel 23 and the shoulder 26 are reduced on one side and increased on the other. This phenomenon acts to increase the pressure on the one side of the shoulder 26 where the escape clearances are reduced, and decrease the pressure on the side of the shoulder where the clearance is increased, whereupon the shaft shoulder tends to return to its centered position within the pressure gland due to the unbalanced forces of pressurized air admitted to opposite sides thereof.

Figure 3:
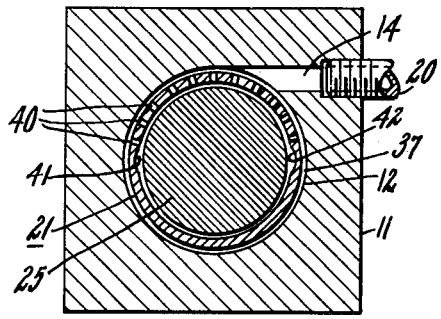
Figs. 3 to 6 are transverse sectional views taken along lines 3—3, 4—4, 5—5 and 6—6, respectively, of Fig. 2.
Figure 4:
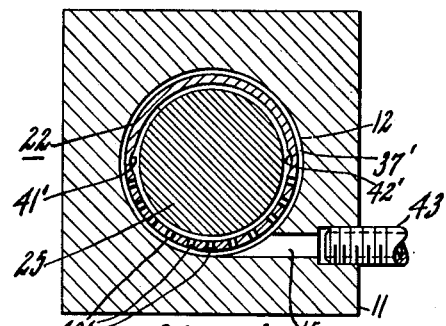
Figure 5:
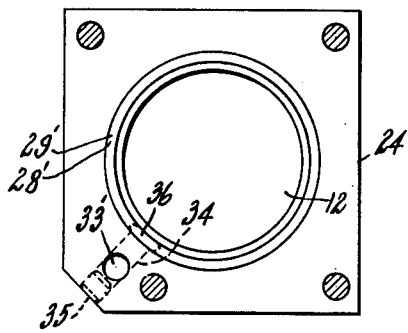
Figure 6:
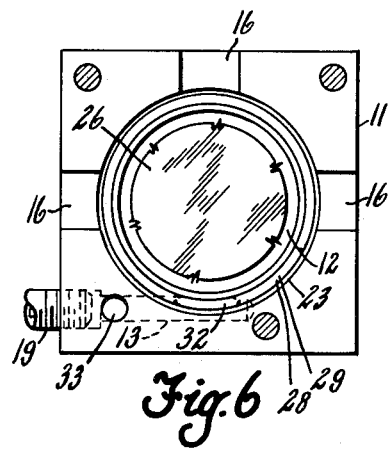

The means for supporting the radial loads on shaft 25 will next be described. With particular reference to Figs. 2, 3 and 4, radial loads are supported by a force couple constituted by the pressurized air surrounding spaced diametrically opposed portions of the shaft 25 within the through bore 12 of the casing. As the bushings 21 and 22 are of identical construction, a detailed description of bushing 21 is deemed to suffice, with like portions of bushing 22 being denoted by like reference characters with primes affixed. The bushing 21 has an annular groove 37 in its external surface between its opposite extremities. The groove 37 constitutes an inlet chamber for pressurized air admitted through the port 14. Pressurized air within the groove 37 cannot escape longitudinally along the through bore 12 of the casing 11 by reason of the shoulder portions 38 and 39 having substantially fluid tight engagement with surfaces of the through bore 12. Disposed substantially intermediate the ends of the bushing 21 is a row of orifices 40. The orifices 40 are disposed substantially in the same vertical plane although a slight deviation therefrom does not materially effect the operation of the bearing assembly. The orifices 40 are circumferentially spaced and extend substantially radial. The orifices extend throughout an arcuate distance of substantially 180°. The bushing 21 also has a pair of diametrically opposed, longitudinally extending grooves 41 and 42 on its internal peripheral surface through which the pressurized air admitted to substantially one-half of the circumferential surface of the shaft 25 may exhaust through the ports provided by the casing 11.

Figure 7:
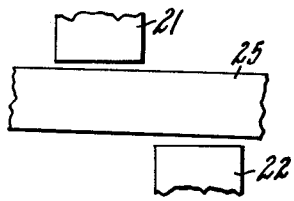
Figs. 7 to 9 are diagrammatic views of the bearing under different radial load conditions.
Figure 8:
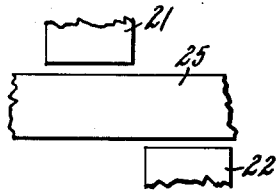
Figure 9:
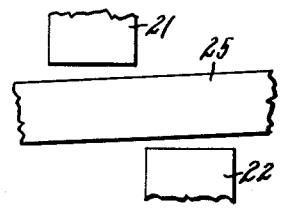

The manner in which radial loads are supported by the novel bearing assembly of the instant invention is as follows: a pressurized area is built up between the inside of the bushings 21 and 22 and the shaft, the radial load being supported by a force couple. The bushings are designed so that pressure will build up only in the upper half of the inside of bushing 21 and the lower half of the bushing 22. The diametrically opposed longitudinally extending grooves in the internal surfaces of the bushings 21 and 22 effectively preclude the establishment of a pressure area in the respective halves of the bushings not having radially extending orifices, whereby a force couple is achieved using the lowest possible pressure in each gland consistent with the size of the escape clearances. This produces an efficiency of operation not possible without the longitudinal grooves. With particular reference to Figs. 7 through 9, there is diagrammatically illustrated three conditions of radial bearing loads, namely: above normal, normal and below normal. The bearing assembly tends to maintain substantial concentricity between the relatively movable parts thereof as follows: As the radial load is increased or decreased, the escape clearances for the pressurized air are respectively decreased or increased. When the radial shaft loads are abnormal, as shown in Figs. 7 and 9, a force couple is also established at the shoulder 26 due to the reduction in escape clearances at diametrically opposed portions of the shoulder, whereupon the shoulder 26 will assist in supporting abnormal radial shaft loads. When the escape clearances for one of the bushings are decreased, a pressure build-up occurs in that bushing which results in automatic compensation for the change in radial loads within certain design limits. In this manner the bearing is able to accommodate a rather broad range of radial loads without altering the valve settings that control the nominal pressure in each gland area.

Pressurized air admitted through either of the conduits 20 or 43 is admitted by the inlet ports 14 and 15, respectively, tangentially to the space provided by the annular channels 37 and 37' of the bushings 21 and 22, respectively. This pressurized air passes through the orifices 40 and 40' of the respective bushings to support the radial load of shaft 25 and then exhausts through the outlet openings in the casing 11. Thus, air exhausts from the gland area of bushing 21 through either ports 18 or ports 17, while air exhausts from the gland area provided by bushing 22 through either ports 18 or the open end of the casing 11.

Figure 10:
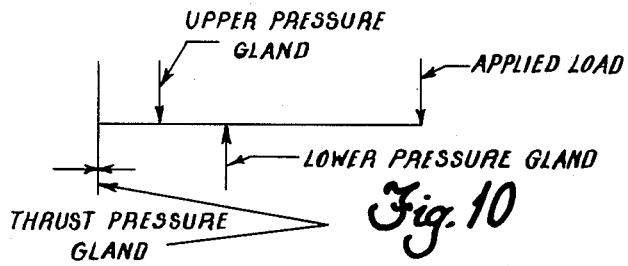
Fig. 10 is a force diagram illustrating the manner in which the various loads are sustained by the bearing assembly.

With reference to Fig. 10, a force diagram is disclosed showing the manner in which the various loads applied to the shaft 25 are sustained by the bearing assembly. In this regard it is to be understood that the bearing will handle not only thrust and vertical forces, but will likewise accommodate small horizontal forces by changing the clearances and pressures in a manner heretofore described in connection with the radial and thrust loading operation. However, as heretofore mentioned, the bearing is particularly designed to accommodate vertical and thrust forces normally encountered in the mass centering of a propeller blade. In this regard, it is to be understood that reference to a bearing constructed for this purpose is to be construed only as an example and not in any way as a limitation.

While the embodiment of the present invention as herein disclosed, constitutes a preferred form, it is to be understood that other forms might be adopted.

What is claimed is as follows:

1. A pneumatic bearing for supporting a shaft including, a housing having a bearing surface for the end of said shaft, means for introducing pressurized fluid at diametrically opposed, axially spaced areas between said bearing surfaces and said shaft and whereby the radial load of said shaft is supported by a force couple, said shaft having a radially extending shoulder thereon disposed in an annular groove in said housing, and means for introducing pressurized fluid between opposite sides of said shoulder and the walls of said grooves for supporting the end thrust load and assisting in the support of abnormal radial load of said shaft.

2. A pneumatic bearing for supporting a shaft including, a housing having a bearing surface for the end of said shaft, orifice means in said bearing surface for introducing pressurized fluid at diametrically opposed, axially spaced areas to form a fluid film constituting a force couple for supporting the radial loads applied to said shaft, said shaft having a radially extending shoulder thereon disposed in an annular groove in said housing, and means for introducing pressurized fluid between opposite sides of said shoulder and the walls of said groove for supporting the thrust loads and assisting in the support of abnormal radial loads applied to said shaft.

3. In a shaft bearing, a housing, a pair of axially spaced sleeves in said housing for supporting a shaft, said sleeves presenting a bearing surface with a plurality of axially spaced apart sets of circumferentially spaced orifices, means for supplying pressurized fluid to each set of orifices to form a film of fluid between diametrically opposed, axially spaced portions of said shaft and said bearing surface whereby radial loads imposed upon said shaft are sustained by a force couple, and an outlet opening in said housing between said sleeves for exhausting fluid therefrom.

4. In a shaft bearing, a pair of sleeves for supporting a shaft, said sleeves presenting a bearing surface with a plurality of axially spaced apart sets of circumferentially spaced orifices, means for supplying pressurized fluid to each set of orifices to form a film of fluid between diametrically opposed, axially spaced portions of said shaft and said bearing surface whereby radial loads imposed upon said shaft are sustained by a force couple, said shaft having a radially extending annular shoulder thereon adjacent one end thereof, and means for admitting pressurized fluid to opposite sides of said shoulder for supporting shaft thrust loads and assisting in the support of abnormal radial shaft loads.

5. A pneumatic bearing for supporting a shaft including, a housing having a through bore, a pair of spaced bushings disposed in said bore, said bushings presenting a bearing surface for supporting said shaft, each bushing having an annular channel in its outer peripheral surface and a pair of longitudinally extending, diametrically opposed grooves in its inner peripheral surface, and means for introducing pressurized fluid at diametrically opposed, axially spaced areas between said bearing surface and said shaft whereby the radial load of said shaft is supported by a force couple.

6. A pneumatic bearing for supporting a shaft including a housing having a through bore, a pair of spaced bushings disposed in said bore, said bushings presenting a bearing surface for supporting said shaft, each bushing having an annular channel in its outer peripheral surface and a pair of longitudinally extending, diametrically opposed grooves in its inner peripheral surface, a plurality of radially arranged, circumferentially spaced orifices in each bushing intersecting both the annular channel and the bearing surface thereof, said orifices extending throughout an arcuate distance of less than 180°, said bushings being so disposed in said through bore that the orifices in one bushing are diametrically opposed and axially spaced apart from the orifices in the other bushing, and means for introducing pressurized fluid to the annular channel of each bushing whereby radial loads imposed upon said shaft are supported by a force couple.

7. A pneumatic bearing for supporting a shaft including a housing having a through bore, a pair of spaced bushings disposed in said bore, said bushings presenting a bearing surface for supporting said shaft, each bushing having an annular channel in its outer peripheral surface and a pair of longitudinally extending, diametrically opposed grooves in its inner peripheral surface, a plurality of radially arranged, circumferentially spaced orifices in each bushing intersecting both the annular channel and the bearing surface thereof, said orifices extending throughout an arcuate distance of less than 180°, said bushings being so disposed in said through bore that the orifices in one bushing are diametrically opposed and axially spaced apart from the orifices in the other bushing, and inlet openings adjacent opposite ends of said housing and connecting tangentially with the annular grooves of the bushings for admitting pressurized fluid thereto whereby radial loads imposed upon said shaft are supported by a force couple.

8. A pneumatic bearing for supporting a shaft including a housing having a through bore, a pair of spaced bushings disposed in said bore, said bushings presenting a bearing surface for supporting said shaft, each bushing having an annular channel in its outer peripheral surface and a pair of longitudinally extending, diametrically opposed grooves in its inner peripheral surface, a plurality of radially arranged, circumferentially spaced orifices in each bushing intersecting both the annular channel and the bearing surface thereof, said orifices extending throughout an arcuate distance of less than 180°, said bushings being so disposed in said through bore that the orifices in one bushing are diametrically opposed and axially spaced apart from the orifices in the other bushing, inlet openings adjacent opposite ends of said housing and connecting tangentially with the annular grooves of the bushings for admitting pressurized fluid thereto whereby radial loads imposed upon said shaft are supported by a force couple, and an outlet opening in said housing between said bushings for exhausting fluid therefrom.

9. A pneumatic bearing for supporting a shaft including a housing having a through bore, a pair of spaced bushings disposed in said bore, said bushings presenting a bearing surface for supporting said shaft, each bushing having an annular channel in its outer peripheral surface and a pair of longitudinally extending, diametrically opposed grooves in its inner peripheral surface, means for introducing pressurized fluid at diametrically opposed, axially spaced areas between said bearing surface and said shaft whereby the radial load of said shaft is supported by a force couple, said shaft having a radially extending shoulder adjacent one end thereof, cooperable parts of said housing forming an annular groove within which said shoulder is disposed, and means in the sidewalls of said groove for introducing pressurized fluid on opposite sides of said shoulder for sustaining the thrust loads applied to said shaft and assisting in the support of abnormal radial shaft loads.

References Cited in the file of this patent

UNITED STATES PATENTS

| | | |
|---|---|---|
| 1,906,715 | Penick | May 2, 1933 |
| 2,131,170 | Evans | Sept. 27, 1938 |
| 2,354,296 | Arms | July 25, 1944 |
| 2,442,202 | Hughes-Caley | May 25, 1948 |
| 2,578,711 | Martellotti | Dec. 18, 1951 |
| 2,663,977 | Gerard et al. | Dec. 29, 1953 |
| 2,692,803 | Gerard | Oct. 26, 1954 |

FOREIGN PATENTS

| | | |
|---|---|---|
| 172,796 | Germany | July 11, 1906 |